United States Patent [19]
Ehrlich et al.

[11] 3,742,440
[45] June 26, 1973

[54] SYSTEM FOR ACTIVATING A REMOTE UNDERWATER DEVICE

[75] Inventors: Stanley L. Ehrlich, Middletown; Robert E. Kirkland, Barrington, both of R.I.

[73] Assignee: Raytheon Company, Lexington, Mass.

[22] Filed: Nov. 1, 1971

[21] Appl. No.: 194,591

Related U.S. Application Data

[63] Continuation of Ser. No. 871,740, Aug. 12, 1969, and a continuation of Ser. No. 679,785, Nov. 1, 1967, abandoned.

[52] U.S. Cl....... 340/5 T, 340/171 PPF, 340/147 F, 325/28, 325/65, 343/225
[51] Int. Cl. .......................................... H04b 11/00
[58] Field of Search.................. 340/15, 17, 3 R, 340/171 PPF, 5 T, 16, 147 F; 325/28, 30, 37, 44, 65; 343/225

[56] References Cited
UNITED STATES PATENTS
2,513,342  7/1950   Marshall ................ 340/171 PPF
3,348,226  10/1967  Fischer ...................... 343/225

OTHER PUBLICATIONS
Sherwood, "Undersea Technology," 6/64, pg. 22.

Primary Examiner—Benjamin A. Borchelt
Assistant Examiner—N. Moskowitz
Attorney—Harold A. Murphy, Milton D. Bartlett et al.

[57] ABSTRACT

A system for activating a remote underwater device using a frequency coded acoustic wave generator having at least one notch frequency in the transmission spectrum. The generator is adapted to transmit simultaneous assertion and negation frequencies. An acoustic responsive receiver is located at the remote underwater device. The receiver includes a code validation logic arrangement responsive to each received acoustic wave for verifying the simultaneous presence and absence of the assertion and negation frequencies. A utilization circuit, also in the receiver, is responsive only to a verification signal from the validation logic.

9 Claims, 5 Drawing Figures

TRANSMITTER

United States Patent [19]
Ehrlich et al.
[11] 3,742,440
[45] June 26, 1973
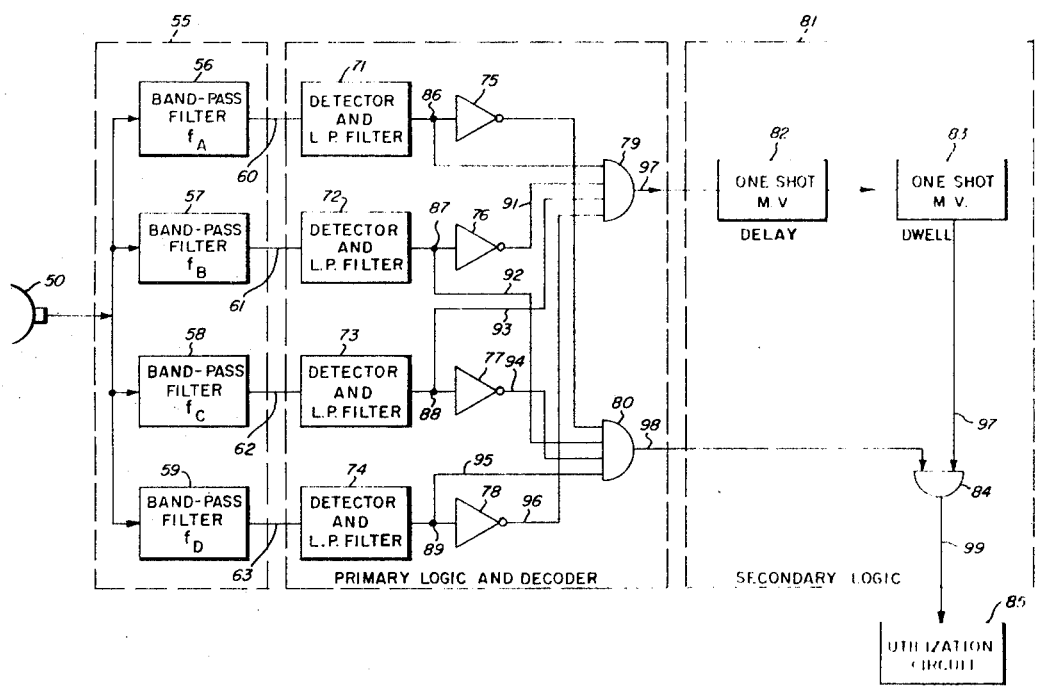

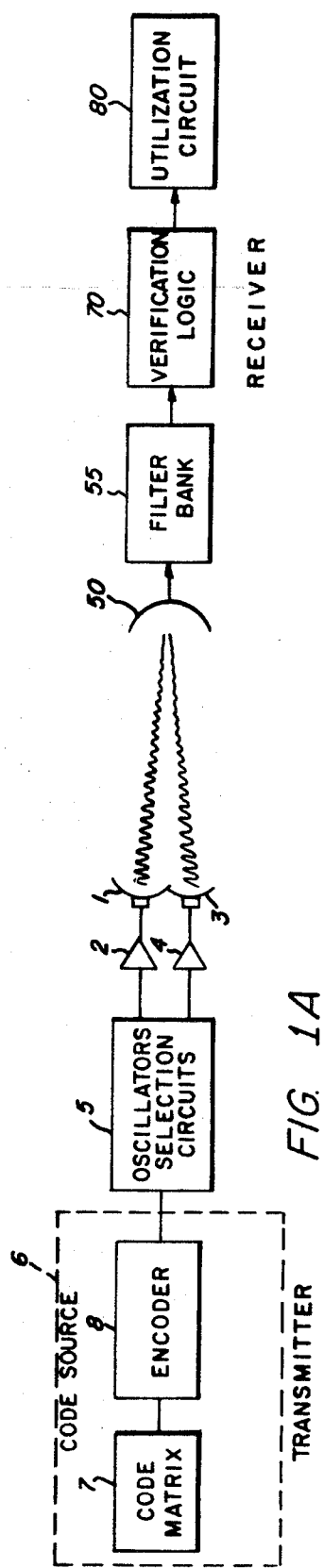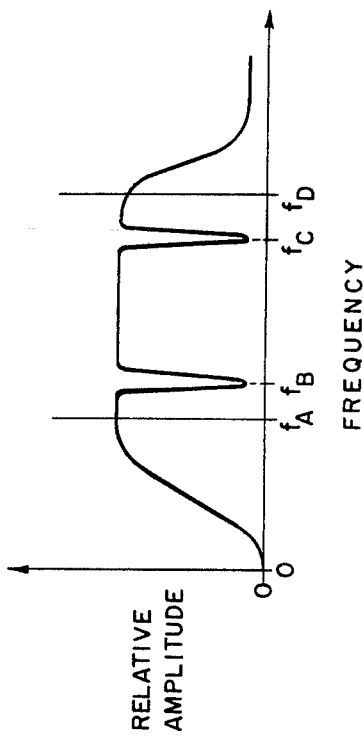

INVENTORS
STANLEY L. EHRLICH
ROBERT E. KIRKLAND
BY Robert Bruce Brodie
ATTORNEY

SYSTEM FOR ACTIVATING A REMOTE UNDERWATER DEVICE

This is a continuation of application Ser. No. 871,740 filed Aug. 12, 1969, which is a continuation of application Ser. No. 679,785 filed Nov. 1, 1967, now abandoned.

BACKGROUND OF THE INVENTION

This invention relates to the acoustic activation of remote units, and more particularly, to a system for the activation of remote underwater units.

It is known to use an electrical acoustic receiver which receives time coded sequential signals and which, upon determining that the received signals are properly coded, will detonate an explosive, start a motor, close a relay, turn on a radio transmitter operate a valve or perform some other useful function. There is particular need for activating such a remote device in the depth of the ocean sea, and which upon receipt of an appropriately coded acoustic signal will likewise generate an actuation impulse for operating an electric load device. One such system using time coded pulses for activating a remote unit is described in U.S. Pat. No. 3,138,778 issued on June 23, 1964 to G. F. Dulin.

Generally, both amplitude and close time-sequence modulation type codes are effected by multipath transmission when propagated through the ocean. The patterns sent by the transmitter are distorted by the time they reach the receiver. Because of this limitation only very simple time pulse or amplitude modulated codes are feasible. These necessarily have a high false alarm rate and low security.

In the prior art, combinations of single frequency tones have been used to actuate remote units (see, for example, U. S. Pat. No. 3,293,676 issued to E. A. Link on Dec. 27, 1966). However, such a system is susceptible to a broad band noise source.

It is accordingly an object of this invention to devise a system for activating a remote underwater device operable in a broad range of noise environments and secure against accidental triggering.

It is yet another object of this invention that such a system should permit localization of a particular underwater device from among a plurality of such remote underwater devices. Additionally, such a system should permit the selection of one or more from a group of underwater devices.

SUMMARY OF THE INVENTION

The objects of the invention are satisfied in a preferred embodiment in which a frequency coded acoustic wave generator having at least one notch frequency in its transmission spectrum is adapted to simultaneously transmit selected assertion and negation frequencies. The terms assertion and negation frequencies refer to a frequency type of coding in which the simultaneous presence of one or more specific frequencies (assertions) and the absence of one or more specific frequencies (negations) are necessary to activate a remote unit.

An acoustic responsive receiver is located at the remote underwater device. The receiver comprises a code validation logic arrangement responsive to each received acoustic wave for verifying the simultaneous presence and absence of the selected assertion and negation frequencies. A utilization circuit (an electrical load device) is responsive to the verification signal from the logic arrangement.

Frequency coding of this form is particularly advantageous because the acoustic wave remains exact and identifiable as it is transmitted through the water, even when reflected and refracted by discontinuities in the propagation medium. As may be apparent, the use of single or multiple assertion frequencies by themselves do not offer protection against broadband noise or unauthorized attempts at actuation because it is susceptible to any broadband or swept frequency transmission.

As a first degree of security against broadband noise as found in the preferred embodiment, two frequencies may be used, such as a single assertion frequency and an adjacent negation frequency. The only way to subvert this coding arrangement would require equipment sufficient to sweep a frequency or a notch through a broadband noise source.

The use of two assertion frequencies and one negation frequency improves security over the two-frequency code described above. However, this arrangement is sometimes vulnerable to unauthorized actuation. This may be achieved by sweeping a notch through a broadband source for the two assertion combinations and sweeping a frequency for the two negation combinations.

The use of a code having at least four frequencies or more, judiciously selected, results in a high degree of improvement over the previous frequency code. Such a code may consist of two assertion and two negation frequencies arranged so that one negation frequency is between the two assertion frequencies. The previously described techniques of notch or frequency sweeping do not cause actuation so that the probability of false triggering approaches zero in the limit.

BRIEF DESCRIPTION OF THE DRAWINGS

FIG. 1A is a block diagram representation of the acoustic transmitter and the acoustic receiver located at the remote underwater device.

FIG. 1B is a logic representation of the assertion and negation frequency combinations.

FIG. 1C shows a relative amplitude versus frequency curve exhibiting notches.

DESCRIPTION OF THE PREFERRED EMBODIMENT

Figure 2A:
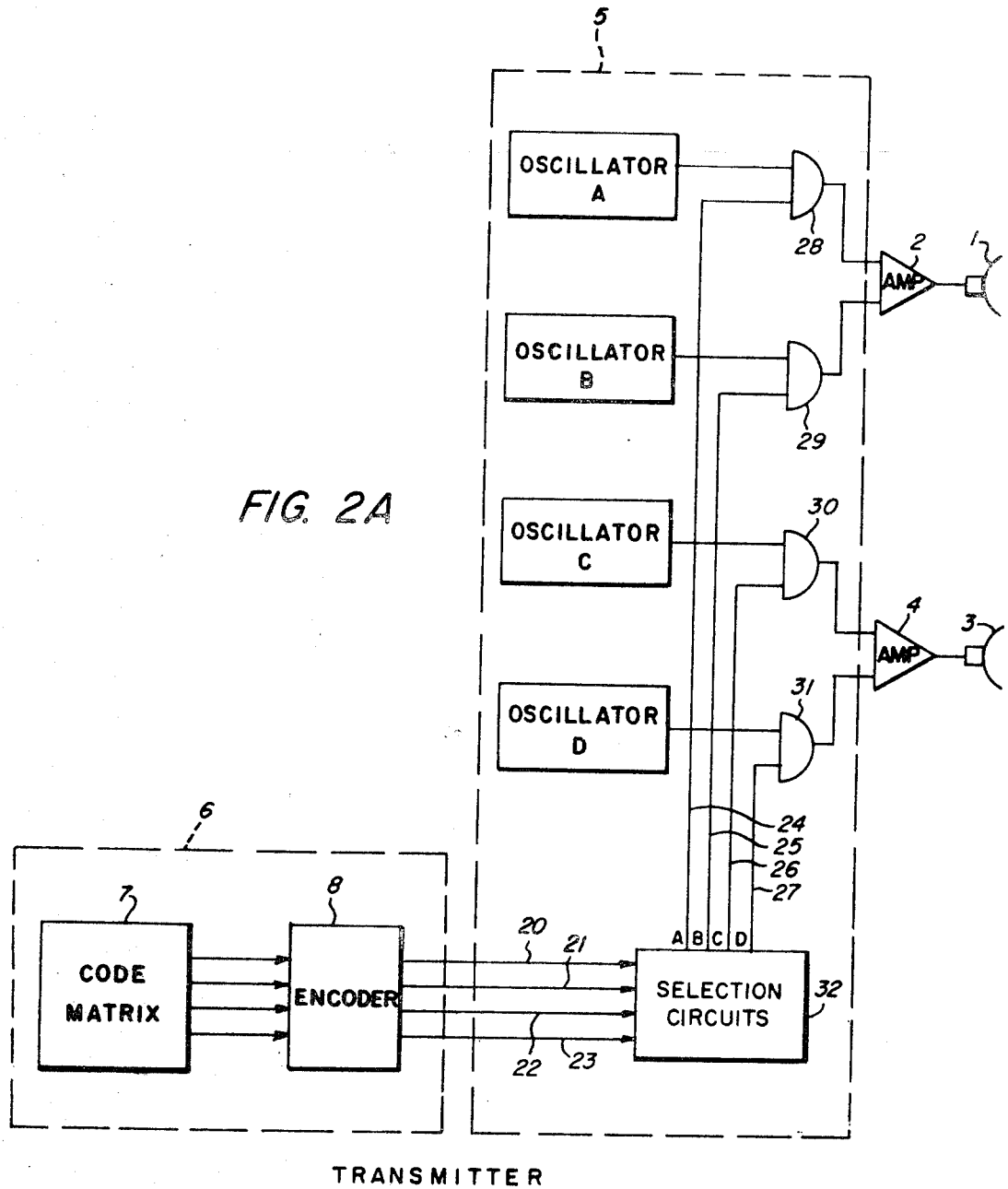
FIG. 2A is a logic level representation of the transmitter shown in FIG. 1A.

FIG. 1A shows an acoustic wave generator on the left and a receiver remote from the generator on the right. The acoustic wave generator, or more simply the transmitter, produces a frequency coded acoustic wave. The frequency encoding consists of simultaneous assertion and negation frequencies. As previously explained, this means the transmitting of certain specific frequencies and the deliberate omission of other frequencies (negation). The specification of what frequencies to transmit and omit are obtained from code source 6 in the form of a binary number represenation of ones and zeros. Selection circuits and oscillators 5 are responsive to the binary code and generate the specific frequencies. These frequencies are applied simultaneously to dual channels represented by amplifiers 2 and 4. The amplifiers drive corresponding transmitting transducers 1 and 3.

If the acoustic wave is incident upon receiving transducer 50, the converted electrical signal is applied to filter bank 55. Verification logic 70 will apply a verification signal to utilization circuit 80 only if the outputs of the filter bank contain the simultaneous presence and absence of the selected assertion and negation frequencies.

Two transmitting channels are used in the preferred embodiment to achieve a high source transmitting level while avoiding premature cavitation of the sonic medium.

FIG. 1C represents a transmission spectrum of relative amplitude versus frequency. For purposes of illustration and description of the preferred embodiment, four frequencies will be used. The notches in the transmission spectrum in FIG. 1C are represented by frequencies $f_B$ and $f_D$. The assertion frequencies are respectively represented as $f_A$ and $f_C$.

FIG. 1B shows examples of the logical binary representations of the codes which may be provided by code source 6. The function code 1 requires the presence (assertion) of frequencies $f_A$ and $f_C$ and the simultaneous absence of frequencies $f_B$ and $f_D$. Likewise, function code 2 requires the simultaneous absence (negation) of frequencies $f_A$ and $f_C$ as well as the simultaneous presence of frequencies $f_B$ and $f_D$. From a coding point of view, the use of four frequencies provides a maximum code capacity of 16. In practice the maximum code capacity would not be utilized for the reason that it would be desirable to have sufficient redundancy to protect the code in transmission. It should be noted that the frequencies for this example are spaced from $f_A$, being the lowest frequency, through $f_D$, being the highest frequency.

The transducers 1, 3, and 50 preferably comprise pressure proof lead zirconate titanate spheres tested to 2,000 pound per square inch. The pass bands should be between 24 kiloherz to 46 kiloherz with a transmitting source level of +87$db$/microbars and a receiving sensitivity of −90$db$//volt/microbar.

FIG. 2A is a more detailed view of the transmitter. Code source 6 may comprise a code matrix 7 driving an encoder 8. The code matrix may consist of any one of a number of well-known memory media such as magnetic cores, ferrites or even magnetic tape with suitable reading electronics. In the preferred embodiment, the code matrix is a simple electronic readout from a core matrix driving an encoder comprising suitable and well known pulse shaping and timing circuitry. If the code matrix or other memory medium is serial, then the encoder must necessarily convert the information in an appropriate register so that the information may be applied in parallel on corresponding lines 20, 21, 22 and 23.

The selection circuits and oscillators 5 comprise four oscillators A, B, C, and D having four different resonance frequencies of which $f_A$ is the lowest and $f_D$ is the highest The oscillators should preferably be of the crystal frequency controlled type with their operating resonance frequencies in the range between 24 to 46 kiloherz.

AND gates 28, 29, 30 and 31 terminate the respective corresponding oscillators A, B, C, and D. Amplifier 2 terminates AND gates 28 and 29. Similarly, amplifier 4 terminates AND gates 30 and 31. Selection circuits 32 turn the AND gate on and off by the application of a suitable binary signal. Thus, a voltage impressed respectively on lines 24, 25, 26 or 27 would gate through a signal at the respective frequencies from oscillators A, B, C or D through the corresponding AND gates 28, 29, 30 or 31.

When an appropriately coded binary signal from code source 6, such as the 1010, is applied in parallel to lines 20, 21, 22 and 23, the selection circuits 32 will apply a voltage on lines 24 and 26. This in turn will actuate AND gates 28 and 30.

Consequently, a frequency $f_A$ and $f_C$ will be applied respectively to amplifiers 2 and 4. Similarly, 0101 would cause frequency $f_B$ and $f_D$ to be applied through respective AND gates 29 and 31 to amplifiers 2 and 4. It should be noted in passing that the code used is a two out of four code.

Figure 2B:
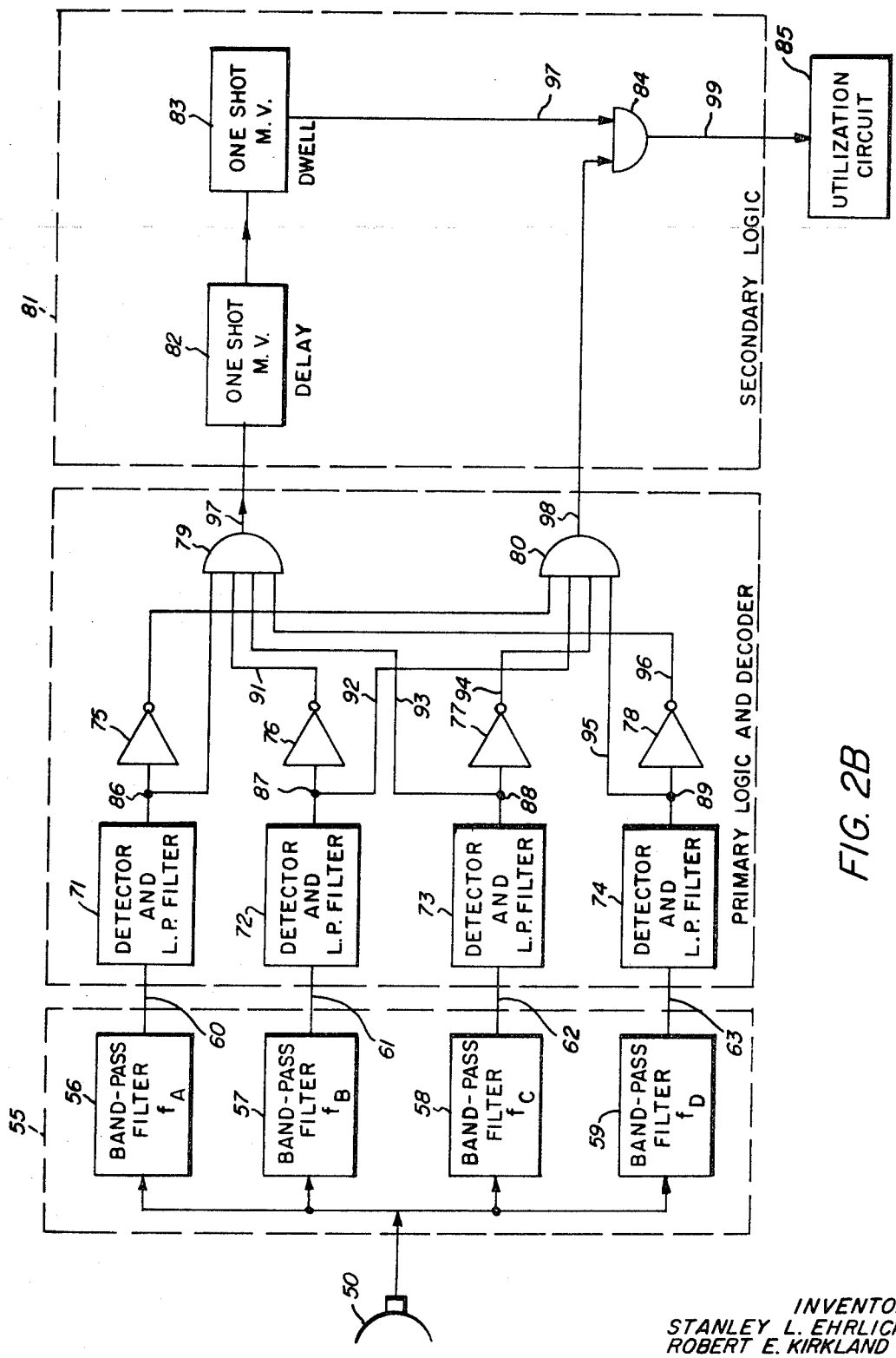
FIG. 2B is a logic level representation of the receiver shown in FIG. 1A.

FIG. 2B is a detailed logic diagram of the receiver. As previously mentioned, an acoustic wave incident upon transducer 50 has its electrical analog applied to filter bank 55. Filter bank 55 may comprise a plurality of bandpass filters 56, 57, 58 and 59 which have their respective center frequencies, tuned to $f_A$, $f_B$, and $f_C$, and $f_D$. The outputs of the bandpass filters are applied in parallel to verification logic 70.

Verification logic comprises primary logic and decoder arrangement 70 and secondary logic 81. The primary logic 70 comprises a plurality of detector and low pass filter arrangements 71, 72, 73 and 74 connected to corresponding bandpass filters over lines 60, 61, 62 and 63. An output upon any of the respective lines having an amplitude exceeding a predetermined minimum is rectified and filtered and applied as a DC level or pulse to the corresponding inverters 75, 76, 77 and 78 at their input nodes 86, 87, 88 and 89. The Primary Logic and Decoder further includes two AND gates 79 and 80. These gates are directly connected to the secondary logic 81.

AND gate 79 in combination with the inverter 75 through 78 is wired up to pass a 1010 input. This corresponds at filters 71 through 74, the simultaneous presence of frequencies $f_A$ and $f_C$ and the absence of frequencies $f_B$ and $f_D$. Similarly, AND gate 80 in combination with the inhibit gates 75 through 78 is wired up to pass the input 0101. This represents the simultaneous absence of frequencies $f_A$ and $f_C$ and the presence of frequencies $f_B$ and $f_D$. Restated, a signal will pass through AND gate 79 upon the presence of the specified assertion and negation frequencies while another signal will pass AND gate 80 if the dual of the frequency signals are presented at its terminal.

The secondary logic 81 comprises AND gate 84 being driven by the conjunctive input of AND gates 79 and 80. The secondary logic further includes in the line 97 two one-shot multivibrators 82 and 83 in series therewith.

In operation, the activation of the remote underwater device through the receiver is achieved by sending out two frequency encoded transmissions bearing the same code. Thus, a code having a binary representation 1010 would, in this embodiment, represent the assertion frequencies $f_A$ and $f_C$ and the negation frequencies $f_B$ and $f_D$. The first code transmission, assuming that it is properly received, is decoded by the primary logic 70. A signal is then applied through AND gates 79 upon line 97. This will one-shot multivibrator 82. In this regard multivibrators 82 and 83 define a time gate or period within which the second code sequence should be received. If the code is not received within the defined time period, then the utilization circuit 85 will not be activated. If a second code is received, then a pulse is gated through AND gate 84 to circuit 85. This arrangement may be implemented by any one of a number of other time base gates.

AND gate 84 is activated by the concurrent presence of a signal from multivibrator 83 and a signal of the logical dual of the received code on line 98 from AND gate 80. The logical dual of 1010 is 0101. Multivibrator 83 can only be set upon the second code signal.

It may be desired to activate a number of different units, or, further, it may be desired to have one unit be responsive to a number of distinct messages. In the case where a number of different remote units are used the Primary Logic and Decoder 70 of each unit will be wired to pass only the code which is unique to it. In the case of a single unit it is an evident extension of the principle, as taught in this invention, to devise a sequential machine responsive only to a proper successive frequency code combination. Alternatively, the inverter-AND gate arrangements may be provided in parallel, rearranged with different interconnections to provide a satisfactory decoding of successive or paralleled frequency coded transmissions.

In summary, a system for activating a remote underwater device has been described. The system comprises a frequency coded acoustic wave generator having at least one notch frequency in its transmission spectrum. The generator simultaneously transmits the selected assertion and negation frequencies. An acoustic responsive receiver located at the remote underwater device contains a code validation logic arrangement responsive to each received acoustic wave. This logic arrangement verifies the simultaneous presence or absence of the transmitted selected assertion and negation frequencies. A utilization circuit is then actuated in response to the verification signal.

We claim:

1. In a remote underwater device actuable by at least two predetermined frequencies $f_A$ and $f_D$, the improvement comprising:

detecting and logic means responsive to each incident acoustic wave for activating the device only upon the detected joint presence of at least two predetermined frequencies $f_A$ and $f_D$ and the absence of at least two other predetermined frequencies $f_B$ and $f_C$ where $f_A < f_B < f_D < f_C$; the detecting and logic means including:

$n$ narrow band filters tuned to the predetermined frequencies $f_A$, $f_B$, $f_C$, and $f_D$, the filters providing corresponding output signals $e_A$, $e_B$, $e_C$, and $e_D$ indicating the presence of the desired frequency;

a first logic arrangement coupling the n arrow band filters for providing an output signal $S_1$ where $S_1 = e_A \cap \bar{e}_B \cap e_D \cap \bar{e}_C$;

a second logic arrangement also coupling the $n$ narrow band filters for providing an output signal $S_2$ where $S_2 = \bar{e}_A \cap e_B \cap \bar{e}_D \cap e_C$; and a third logic arrangement for generating a signal $S_3$ for activating the device when $S_3 = S_1 \cap S_2$.

2. The detecting logic according to claim 1, wherein the third logic arrangement includes:

an AND gate coupling the first and second logic arrangements; and means interposed between the first logic arrangement and the AND gate for applying the $S_1$ signal to the corresponding AND gate input if a predetermined number of $S_1$ signals have been detected within a given time after receipt of the first $S_1$ signal.

3. In combination:

means for generating a sequence of signal pulses, having a predetermined spectrum in which certain predetermined frequencies are present and in which other predetermined frequencies are absent;

means responsive to said sequence of signal pulses for detecting the presence and absence of said predetermined frequencies of said spectrum and providing a first signal indicating such presence and such absence of said frequencies;

means responsive to said first signal of said detecting means for providing a second signal at a predetermined time subsequent to said first signal; and means, responsive to the temporal concurrence of said second signal with said first signal in response to a subsequent one of said sequence of said signal pulses, for providing a signal indicating the simultaneous presence of said second signal and said subsequent first signal of said detecting means.

4. The combination in accordance with claim 3 wherein said response of said frequency detecting means will occur only upon the simultaneous presence of at least two of said frequencies and the simultaneous absence of at least two of said frequencies.

5. The combination in accordance with claim 3 wherein said frequency detecting means comprises a plurality of frequency responsive filters and said sequence of signal pulses are pulses of acoustic energy.

6. A sonic communication system comprising:

means for generating a sequence of signal pulses having a predetermined spectrum in which certain predetermined frequencies are present and in which other predetermined frequencies are absent; and means for receiving said sequence of signal pulses, said receiving means being responsive to the difference in the times of occurrence of one of said signal pulses and of a subsequent one of said signal pulses of said sequence for providing a first signal indicating the presence of said subsequent pulse at a predetermined time after the occurrence of said one of said signal pulses, said receiving means being furthermore responsive to the presence of said present frequencies and to the absence of said absent frequencies of said spectrum for providing said first signal only if said certain predetermined frequencies are present and if said other predetermined frequencies are absent.

7. In combination:

means for generating a sequence of signal pulses, a first pulse in said sequence of pulses having a first frequency spectrum in which certain predetermined frequencies are present and in which other predetermined frequencies are absent, a second pulse in said sequence of pulses having a second frequency spectrum different from said first spectrum, said second spectrum having certain predetermined frequencies which are present and other predetermined frequencies which are absent;

means responsive to said sequence of signal pulses for detecting the presence and absence of said predetermined frequencies of said first spectrum and providing a first signal indicating such presence and such absence;

means responsive to said sequence of signal pulses for detecting the presence and absence of said predetermined frequencies of said second spectrum and providing a second signal indicating such presence and such absence;

means for delaying said first signal for a predetermined interval of time; and means responsive to the temporal concurrence of said delayed first signal and said second signal for providing a third signal indicating the simultaneous presence of said delayed first signal and said second signal.

8. The combination according to claim 7 wherein said sequence of signal pulses are pulses of acoustic energy.

9. A secure communication system comprising:

means for radiating pulse train signals into a medium, said pulse train signals having a predetermined frequency spectrum in which a plurality of predetermined frequencies are present and in which a plurality of predetermined frequencies are absent, one of said absent frequencies being located between two of said present frequencies and one of said present frequencies being located between two of said absent frequencies in said frequency spectrum;

means spaced from said radiating means in said medium for receiving said pulse train signals; and means fed by said receiving means and responsive to said pulse train signals for decoding said pulse train signals, said decoding means having logic means responsive to the relative spectral positions of said present frequencies and said absent frequencies in said spectrum for providing a signal if, and only if, there is an absence of said absent frequency between two of said present frequencies and if, and only if, there is a presence of said present frequency between two of said absent frequencies.

* * * * *